United States Patent
Srikar et al.

(10) Patent No.: US 11,551,296 B2
(45) Date of Patent: Jan. 10, 2023

(54) SYSTEM AND METHOD FOR ANALYZING DATA BY IDENTIFYING PATTERNS

(71) Applicant: Financial Industry Regulatory Authority, Inc., Washington, DC (US)

(72) Inventors: Shreyas Srikar, Washington, DC (US); Chi-Keung Chow, Washington, DC (US); Raghu Raman, Washington, DC (US); Madhukesh Siddalingaiah, Washington, DC (US); Susan Tibbs, Washington, DC (US)

(73) Assignee: Financial Industry Regulatory Authority, Inc., Washington, DC (US)

( * ) Notice: Subject to any disclaimer, the term of this patent is extended or adjusted under 35 U.S.C. 154(b) by 37 days.

(21) Appl. No.: 15/929,488

(22) Filed: May 5, 2020

(65) Prior Publication Data

US 2021/0350457 A1 Nov. 11, 2021

(51) Int. Cl.
*G06Q 40/04* (2012.01)
*G06N 20/00* (2019.01)
(Continued)

(52) U.S. Cl.
CPC .......... *G06Q 40/04* (2013.01); *G06K 9/6256* (2013.01); *G06N 20/00* (2019.01); *G06Q 30/0206* (2013.01)

(58) Field of Classification Search
CPC .... G06Q 40/00; G06Q 40/04; G06Q 30/0206; G06Q 30/08; G06N 20/00; G06K 9/6256
See application file for complete search history.

(56) References Cited

U.S. PATENT DOCUMENTS 7,599,867 B1 * 10/2009 Monroe ................. G06Q 20/10
382/181
7,912,781 B2 * 3/2011 Rosenthal .............. G06Q 40/06
705/37

(Continued)

OTHER PUBLICATIONS

International Search Report, International Application No. PCT/US2021/030935 for Financial Industry Regulatory Authority, Inc., dated Aug. 11, 2021 (13 pages).

(Continued)

*Primary Examiner* — Hani M Kazimi
(74) *Attorney, Agent, or Firm* — Finnegan, Henderson, Farabow, Garrett & Dunner, LLP

(57) ABSTRACT

Systems and methods for identifying a pattern in data to detect a behavior of interest. The systems and methods receive a data stream representing a series of events occurring over a time interval. The systems and methods determine, for the interval, a depth indicating the amount of interest during the interval, where the interest represents an amount of a selected activity during that interval for a selected parameter. The systems and methods also generate a depth chart for the activities at different values of the selected parameter over a series of intervals, train a machine-learning image-classification model using depth chart images; identify the behavior of interest using predictions from the trained machine-learning model and target pattern; and provide an indication of the presence or absence of the behavior of interest. The parameter can represent a quantity and associated price of a commodity in a market.

22 Claims, 10 Drawing Sheets

(51) Int. Cl.
   *G06K 9/62*   (2022.01)
   *G06Q 30/02*   (2012.01)

(56) References Cited

U.S. PATENT DOCUMENTS

| | | | | |
|---|---|---|---|---|
| 8,239,301 | B2 * | 8/2012 | Monroe | G06Q 40/00 |
| | | | | 705/37 |
| 8,463,679 | B2 * | 6/2013 | Kaplan | G06Q 10/10 |
| | | | | 705/7.11 |
| 10,672,075 | B1 * | 6/2020 | To | G06Q 40/04 |
| 2018/0260896 | A1 * | 9/2018 | O'Brien | G06Q 40/04 |
| 2018/0276541 | A1 | 9/2018 | Studnitzer et al. | |
| 2019/0325340 | A1 * | 10/2019 | Nitta | G06N 20/00 |
| 2020/0151565 | A1 * | 5/2020 | Widerhorn | G06N 5/003 |
| 2020/0242491 | A1 * | 7/2020 | To | G06Q 40/04 |

OTHER PUBLICATIONS

Marc Velay et al., "Stock Chart Pattern recognition with Deep Learning," arxiv.org, Cornell University Library, 201 Olin Library Cornell University Ithaca, NY 14853, Aug. 1, 2018 (6 pages).

* cited by examiner

SYSTEM AND METHOD FOR ANALYZING DATA BY IDENTIFYING PATTERNS

TECHNICAL FIELD

This invention relates to systems and methods for converting data into complex patterns to identify target behaviors.

BACKGROUND

Conventional systems analyze large amounts of data to detect fraudulent behavior in certain transactions. Typical systems identify fraudulent behaviors using a set of rules, also called "if-then" constructs, but defining a complex pattern with a set of rules is difficult and prone to error. The amount of data to analyze can consume a significant amount of memory and computing resources.

There is a need to find a faster and more efficient way to model transactional behavior, especially to detect fraudulent behavior.

SUMMARY

A system for identifying a pattern in data to detect a behavior of interest consistent with the invention comprises an input device to provide the data; an output device to provide an indication of the behavior of interest; a memory device storing instructions to identify the pattern; and a processor to execute instructions. The execution of the instructions cause the system to receive a data stream representing a series of events occurring over a time interval; determine, for the interval, a depth indicating the amount of interest during the interval; generate a depth chart for the activities at different values of the selected parameter over a series of intervals; train a machine-learning image-classification model using depth chart images; identify the behavior of interest using predictions from the trained machine-learning model and target pattern; and provide an indication of the presence or absence of the behavior of interest. The interest represents an amount of a selected activity during that interval for a selected parameter.

A method consistent with the invention includes the steps of receiving a data stream representing a series of events occurring over a time interval; determining, for the interval, a depth indicating the amount of interest during the interval; generating a depth chart for the activities at different values of the selected parameter over a series of intervals; training a machine-learning image-classification model using depth chart images; identifying the behavior of interest using predictions from the trained machine-learning model and target pattern; and providing an indication of the presence or absence of the selected behavior. The interest indicates an amount of a selected activity during that interval for a selected parameter.

A computer-readable medium consistent with the invention includes instructions configured to cause at least one processor to perform a method. The method includes the steps of: receiving a data stream representing a series of events occurring over a time interval; determining, for the interval, a depth indicating the amount of interest during the interval; generating a depth chart for the activities at different values of the selected parameter over a series of intervals; training a machine-learning image-classification model using depth chart images; identifying the behavior of interest using predictions from the trained machine-learning model and target pattern; and providing an indication of the presence or absence of the selected behavior. The interest indicates an amount of a selected activity during that interval for a selected parameter.

The detailed description that follows describes exemplary embodiments of the invention.

BRIEF DESCRIPTION OF THE DRAWINGS

The accompanying drawings, which are part of this specification, illustrate representative embodiments and, together with the description, serve to explain the principles of the invention. In the drawings:

FIGS. 4A-4D are views of a graphical user interface (GUI) for the system in

FIG. 3.

DETAILED DESCRIPTION

The systems and methods of this invention are useful for identifying complex patterns in large data sets, especially data sets representing transactional behavior. These systems and methods are very useful to identify suspicious and potentially fraudulent behaviors. These systems and methods are more efficient and accurate that traditional rule-based systems and methods, and are particularly applicable to time-series data.

One implementation of the invention involves machine learning, which requires training. Using this invention to detecting fraudulent behavior in a market can include a depth data set for training. For market-based systems, "depth" or "depth of book" refers to the open interest available at any instant at all price points. "Open interest" refers to the amount of interest in the market in buying or selling units, such as shares, or interest in buying or selling equities, options, securities, etc. As an example, at a given time, e.g., 11:00 AM, the depth on the bid side may be $34.41: 100 shares; $34.42: 50 shares; $34.43: 64 shares; and $34.44: 30 shares.

A depth data set may include transactional market data from an exchange or market data associated with a market participant. For example, the depth data set may include the last depth record of every minute with that depth record acting as a seed value to recreate the depths for events in a subsequent minute. This approach can reduce the size of the required dataset.

Depth of book may be calculated at each event by taking the depth from the last event and adding or subtracting the quantity at the price point of the current event. A SQL script for calculating depth is as follows:

```
select tdate,
    symbol,
    sum_by_key(localprice, locallvsqty_delta) over (parti-
        tion by tdate, symbol order by tim, seq) as bid_depth
from eqty_events
where tdate=date '2019-04-19'
``` and symbol='IBM'
and side=CB'--only bids

The "sum_by_key" function may refer to a user-defined function that enables this standard aggregate function syntax. A "sum_by_key" function may partition data by keys, such as a combination of date, symbol, price point, or firm. The "sum_by_key" function analyzes the chronological time series data by performing rolling sums of interest quantities or other values. The depth at each minute for each symbol may be calculated separately using the "sum_by_key" function. The last record of each minute may be selected and then run on a rolling sum.

The output of the rolling sum may be a 'keyframes' object. A keyframe refers to the last depth record of every minute, which becomes the seed value to recreate the depths for all events in a later minute. The keyframe may also act as a bookmark, enabling efficient look up of a particular minute.

Figure 1:
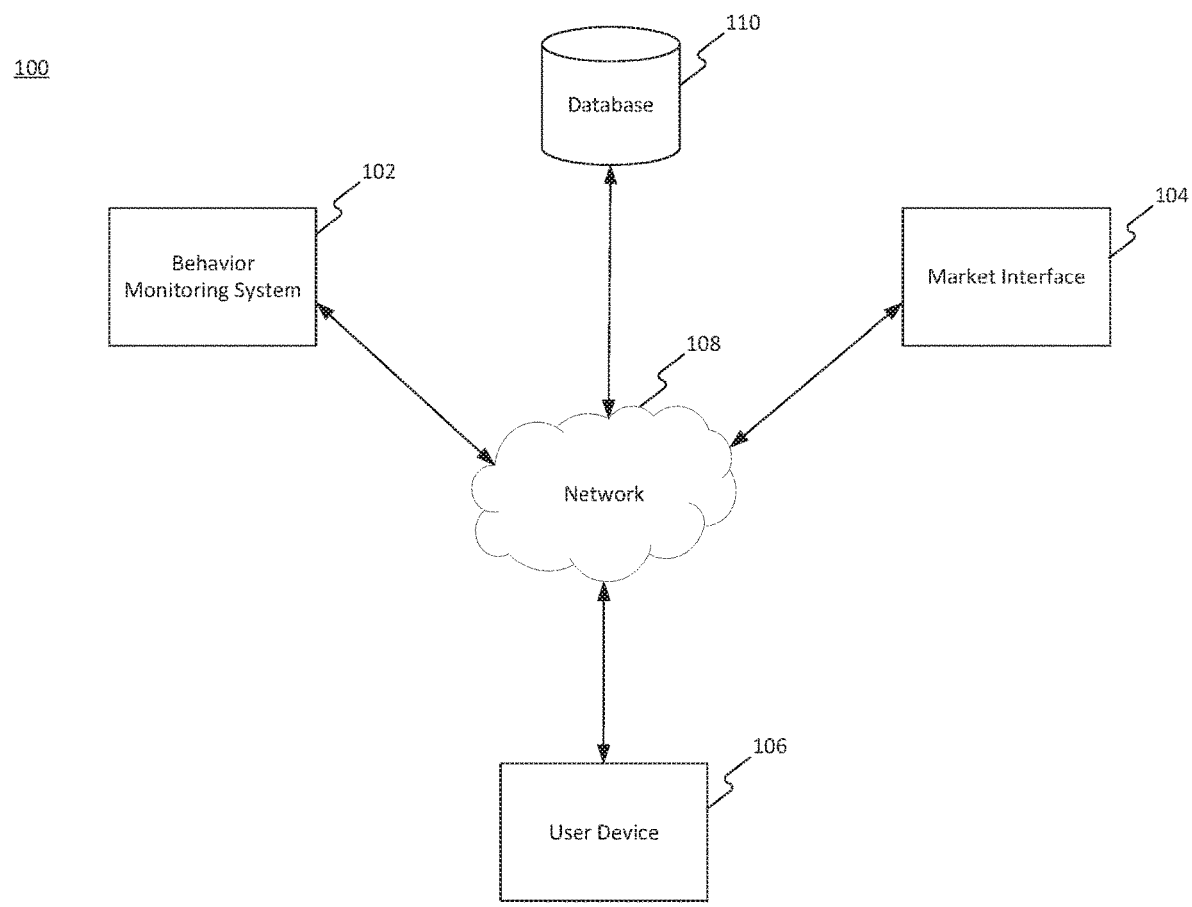
FIG. 1 is a block diagram of a system consistent with invention for identifying patterns.

FIG. 1 is a block diagram of an exemplary system 100 that can implement the invention. System 100 includes a behavior-monitoring system 102, a market interface 104, one or more user devices 106, a network 108, and a database 110. The components of system 100 may connect to a network 108 as in FIG. 1, or may connect directly with each other.

Behavior-monitoring system 102 may be a computing system for analyzing and monitoring data from market interface 104 or user device 106. System 102 uses depth data to train a machine-learning algorithm to identify patterns in market data that may indicate behaviors consistent with market manipulation or fraud.

Market interface 104 may be a computing system for accessing stock markets, bond markets, currency exchange markets, futures markets, or commodities markets. Interface 104 may inform behavior-monitoring system 102, user devices 106, or database 110 about market positions, and may receive instructions from behavior-monitoring system 102 or user device 106. Market interface 104 may provide access using many known protocols such as FIX, FAST, HSVF, SAIL, SBE, UTP Direct, OUCH, ITCH, HTTP, FTP, Millennium.

User device 106 may be a computing system, such as a smartphone, tablet, phablet, desktop, laptop, or server to enable a user to input or receive data from behavior-monitoring system 102. For example, user device 106 may display a depth chart for receive alerts detailing suspicious behaviors identified from behavior-monitoring system 102.

Database 110 may be a relational database storing depth data, market data, and models for identifying patterns indicating behaviors. Database 110 may also include cloud-based databases (e.g., Amazon Web Services S3 buckets), or on-premises databases, Oracle™ databases, Sybase™ databases, or other relational or non-relational databases, such as Hadoop™ sequence files, HBase™, or Cassandra™. Database 110 may include computing components (e.g., database-management system, database server, etc.) to receive and process requests for data stored in memory devices of the database and to provide data from the database.

Although FIG. 1 shows behavior-monitoring system 102, market interface 104, user device 106, network 108, and database 110 as different components, one or more of these components may exist in the same systems.

The configuration and boundaries of the functional building blocks of system 100 are not crucial to the invention. Alternative boundaries are possible if the components perform the specified functions and have the relationships described.

Figure 2:
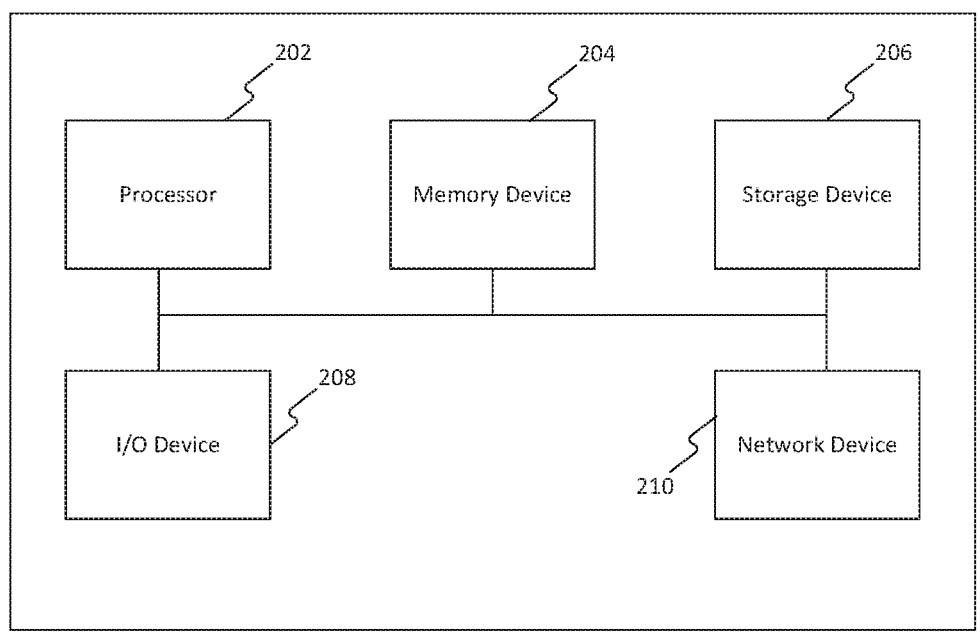
FIG. 2 is a block diagram of a computing device that can implement the invention.

FIG. 2 is a block diagram of a computing device 200 consistent with the present invention that may implement one or more of the components in FIG. 1. Computing device 200 may include one or more processors 202, one or more memory devices 204, one or more storage devices 206, one or more input/output (I/O) devices 208, and one or more network devices 210. Computing device 200 may also include mobile computing devices, such as smartphones or tablets, general-purpose computers, or any combination of these components. While depicted in singular form in FIG. 2, each component in computing device 200 may be multiple systems.

Processor 202 may include one or more known processing devices, such as mobile device microprocessors manufactured by Intel, NVIDIA, or other manufacturers.

Memory device 204 may include one or more storage devices configured to store instructions used by processor 202 to perform functions described below. Memory device 204 may include a random-access Memory (RAM), flash memory, or the like. Preferably, memory devices 204 store software instructions that perform operations when executed by processor 202. The disclosed embodiments are not limited to separate programs or computers to perform dedicated tasks. Memory device 204 may include a single program or multiple programs that generate depth charts and identify patterns, consistent with the invention.

Storage device 206 may include one or more devices configured to store data, such as a hard disk or flash memory storing market data.

I/O device 208 allows receipt of transmission of data by computing device 200 and may include a keyboard, a mouse, a touchscreen, a microphone, or a camera, or any other components to enable those devices to provide input to computing device 200 (e.g., USB ports and associated chipset). I/O device 208 may also include output devices such as a monitor, a printer, speakers, and components to enable those devices to provide inputs to computing device 200, such as a graphics card/chipset, sound card, and USB ports with associated chipsets.

Network device 210 may include devices configured to communicate data to other components of system 100, such as a router, a modem, an Ethernet adapter, or a wireless network adapter.

Each component in FIG. 2 may connect to each other directly or via buses. The entire computing system may have one or more computing devices 200, such as in a cluster of devices).

A computer-readable medium stores instructions that cause processors to perform the methods discussed below. The computer-readable medium may include volatile or non-volatile, magnetic, semiconductor, tape, optical, removable, non-removable, or other types of computer-readable media or storage devices. The computer-readable medium may be the storage unit or the memory module storing the computer instructions, such as a disc or flash drive.

Figure 3:
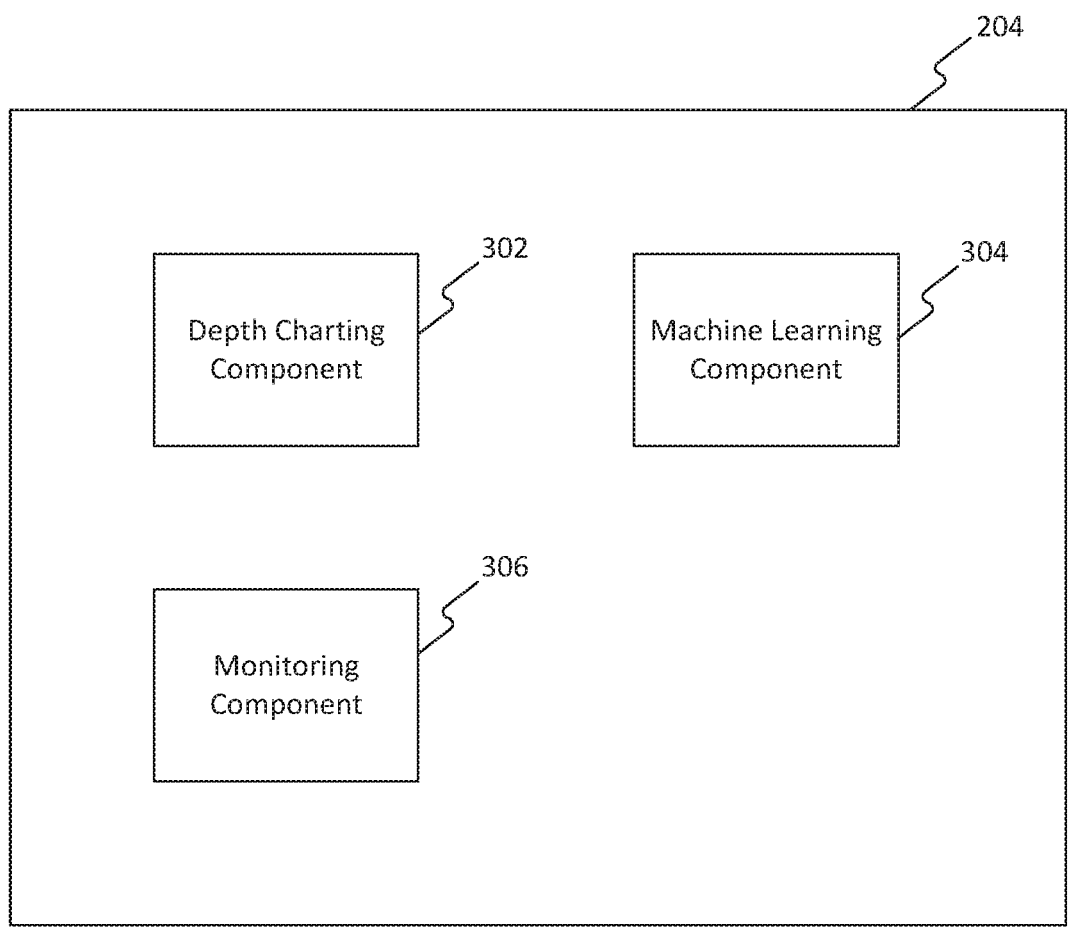
FIG. 3 is a block diagram of a system consistent with the invention for identifying patterns.

FIG. 3 illustrates an embodiment of a memory device containing software components consistent with the present disclosure. Included in memory device 204 are depth-charting component 302, machine-learning component 304, and monitoring component 306. Components 302, 304, and 306 may contain software for execution by a processing device, e.g., processor 202 in behavior-monitoring system 102. Depth-charting component 302, machine-learning component 304, and monitoring component 306 may cooperate to generate depth data, train models, and apply market data to the models.

Depth-charting component 302 may receive market data, for example from market interface 104. That data may include price and bid information associated with a number of market participants. As FIG. 4A shows, depth-charting component 302 may use the received data to generate a depth chart 402, which an interface of behavior-monitoring system 104, such as I/O device 208, or user device 106, may display to a user.

Figure 4A:
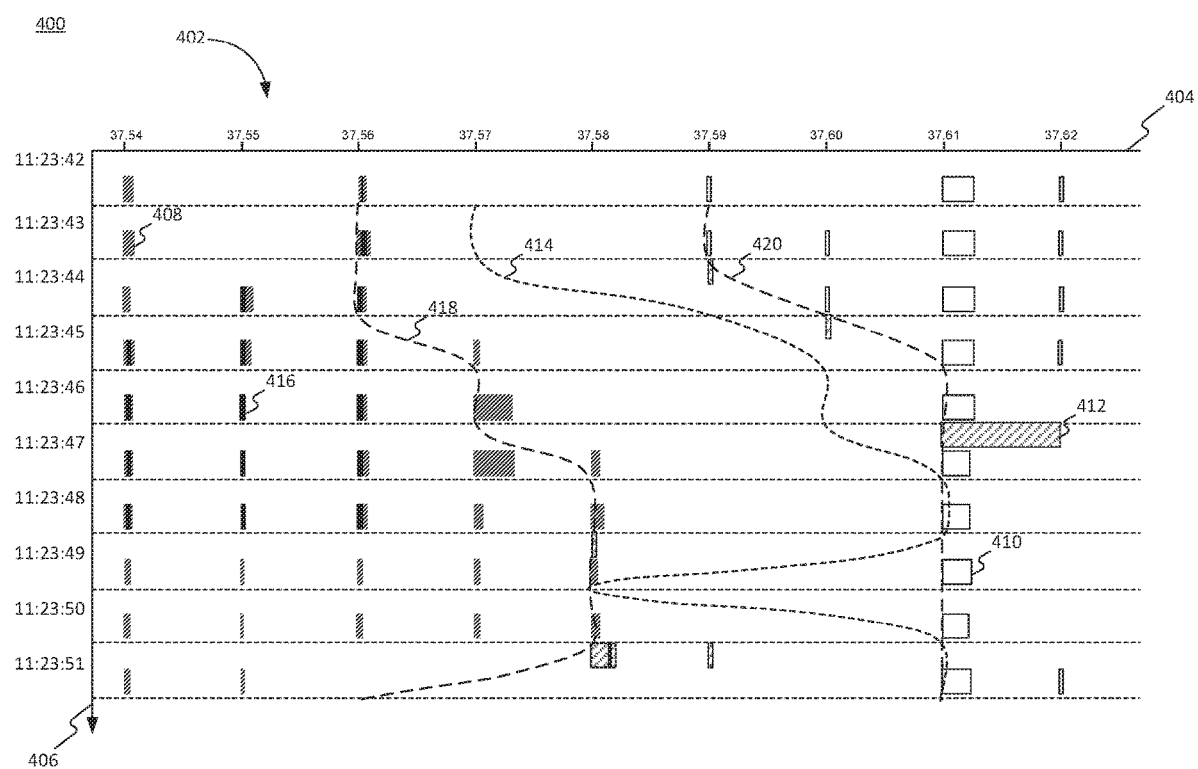

In FIG. 4A, depth chart 402 shows prices on the x-axis 404 and time steps on the y-axis 406, such that time increases downward along the y-axis 406. Depth chart 402 helps a user view the entire market and market participants' activities in the context of the market.

Boxes 408 and 410 illustrate the total interest at each price point and time. Dark grey boxes 408 represent bids, while white boxes 410 represent asks. The width of boxes 408 and 410 indicates the number of shares of the bids or asks (the wider the box, greater the number of shares). Hashed boxes 412 represent executed trades with the trade curve 414 connecting the "last trade price" on each time step of y-axis 406. In FIG. 4A, the last trade price is increasing due to the artificial pressure on the buy side. Black boxes 416 illustrate interest of the market participant 424 selected from participant list 422 shown in FIG. 4B. Curve 418 represents a protected best bid (PBB) curve while curve 420 represents a protected best offer (PBO) curve, and together curves 418 and 420 form the PBBO (protected best bid and offer) curves.

Figure 4B:
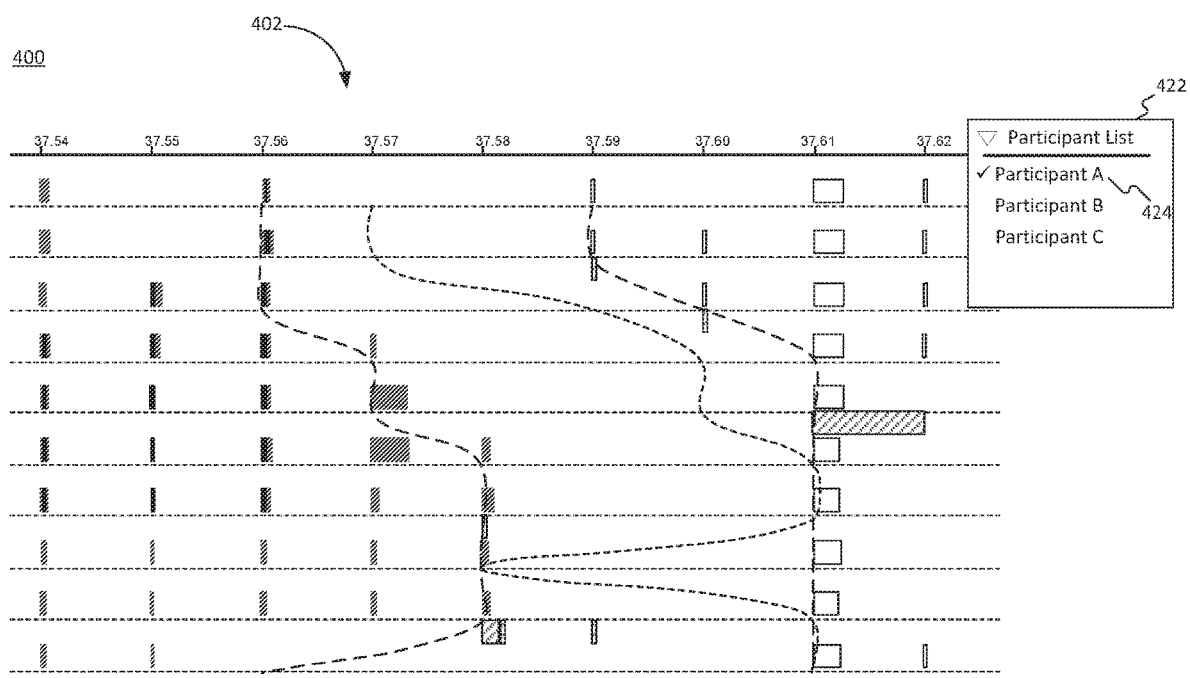

In FIG. 4B, GUI 400 may display a depth chart 402 having boxes displaying cells where the selected participant has interest or trades. These boxes may be illuminated or shaded with a color, and the width of the participant's interest may have the same scale as the total interest. GUI 400 may also enable a user to view the interest or trades of multiple participants by selecting those participants from the participant list 422.

In FIG. 4B, depth chart 402 shows a participant incrementally increasing its position every second in the adjacent price point on the bid side at the same time the market is moving right (the price of the stock is increasing). A large trade occurs around this time, shown by box 412. At 11:23:48, the participant cancels all of its positions, as the bid cells from 11:23:49 no longer indicate interest for the participant. This behavior shows the participant attempting to shift the PBBO curve to the right by creating the appearance of interest on the buy side.

Figure 4C:
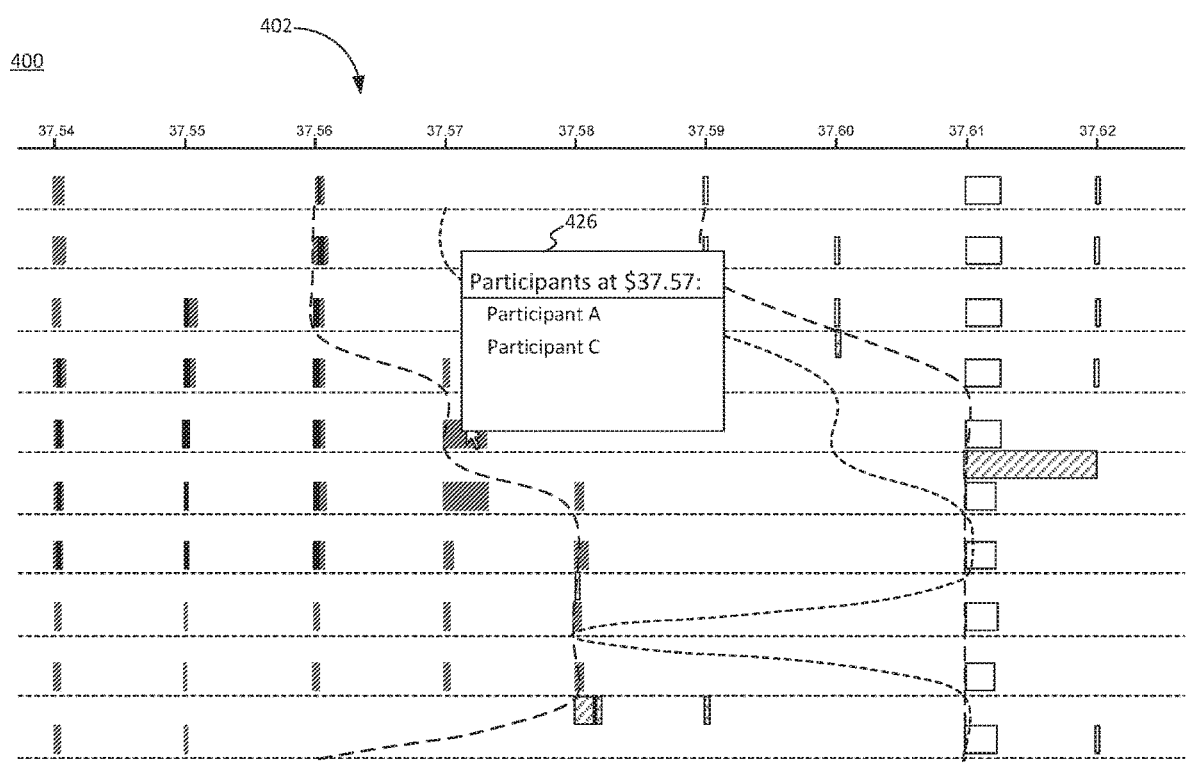

FIG. 4C is another view of GUI 400 that allows user interaction with depth chart 402. A user may hover a cursor over a bid or ask box to cause GUI 400 to display a pop-up window 426 displaying the details of the participants at the selected price point, including their published and hidden quantities.

Figure 4D:
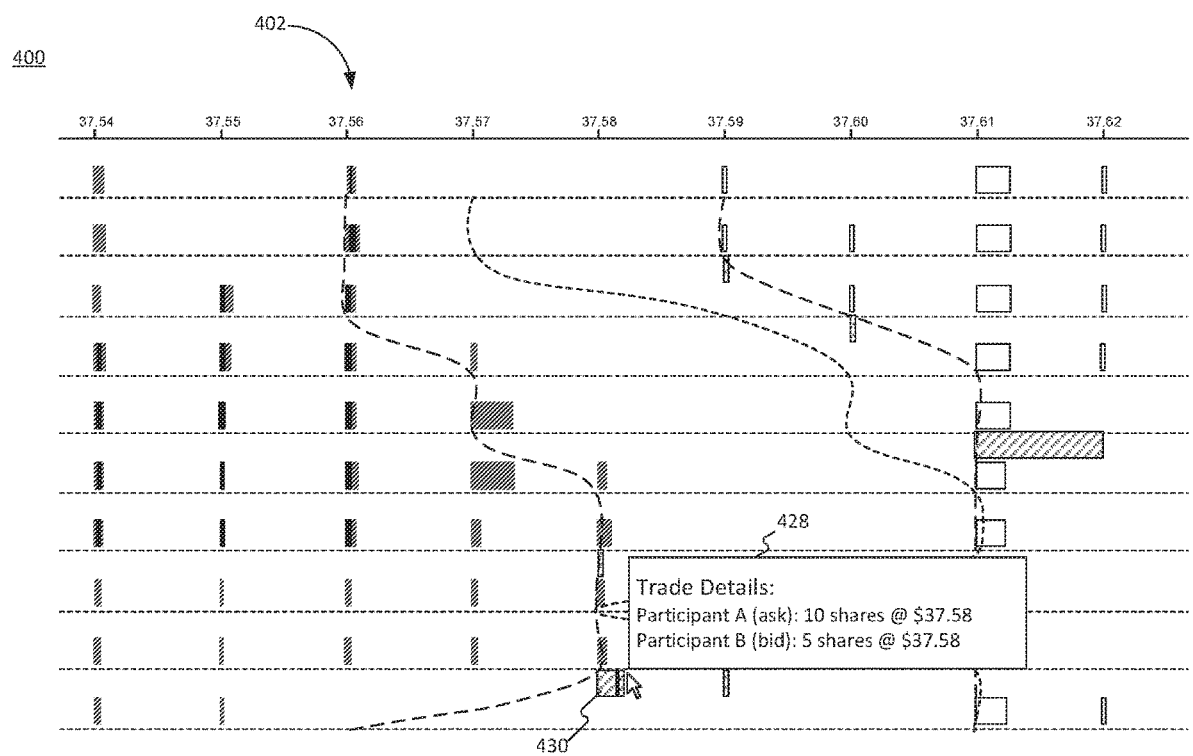

FIG. 4D is another view of GUI 400 that displays a pop-up window 428 when a user hovers a cursor over a trade cell, e.g., box 430. Window 428 may display details of the participants involved in the trade with their sides (e.g., bid or ask) and the quantities of shares they wish to trade.

Figure 5:
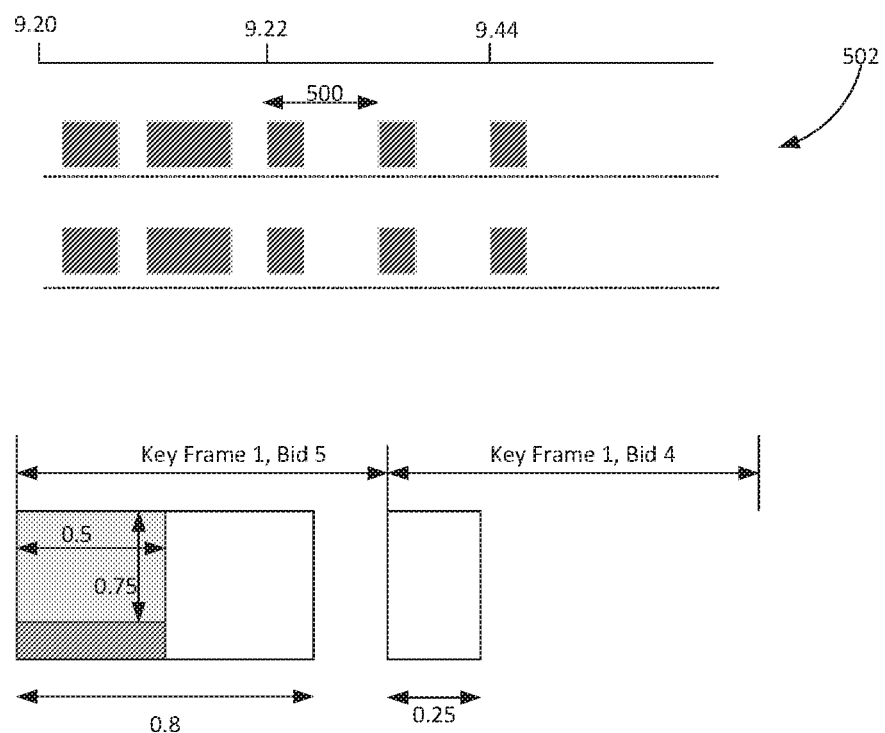
FIG. 5 is an illustration of depth chart pixels for the GUI in FIGS. 4A-4D.

FIG. 5 illustrates a portion 502 of depth chart 402. Each bid and ask cell, e.g., box 408 or 410 of FIG. 4A, can be represented using three values: total interest as a percentage at that price point; market participant total interest as a percentage of total interest; and market participant published interest as a percentage of market participant interest.

The maximum interest in chart portion 502 of FIG. 5 is 500 shares at all price points across all time steps. If the maximum percentage of interest is 100%, the total interest as a percentage at price point $9.22 is 400 shares, which is 80% of the total interest. The market participant's interest is 200 shares, which is 50% of the interest at the price point of $9.22 per share. The market participant's published interest is 150 shares, which is 75% of the market participant interest at the price point of $9.22 per share. Thus, the depth at timestep 1, bid 5, is (0.8, 0.5, 0.75). At timestep 1, bid 4, the depth is (0.25, 0, 0), where the participant's interest and published interest are 0.

Returning to FIG. 3, depth-charting component 302 may receive and analyze data to generate depth charts and store them in database 110 or send them to machine-learning component 304. Machine-learning component 304 may prepare the depth data by labelling patterns monitoring component 306 identifies as indicating a target behavior, such as a market participant attempting to influence the PBBO of a stock artificially, such as by fraudulently increasing the positions on one side, e.g., the buy side as shown in FIG. 4A. This pattern may appear in a depth chart as a "candlestick" pattern, with interest increasing with time along the y-axis. Other patterns identified by machine-learning component 304 may include patterns associated with layering or spoofing by a market participant.

Database 110 may store pattern definitions and sample data sets. The patterns may be defined graphically based on user input via an interface of user device 106. Patterns may also be based on reported behaviors or behaviors of interest.

Before training a model, machine-learning component 304 may normalize the data set from depth-charting component 302 based on price points (e.g., the number of price points on the x-axis of depth chart 402) or timing (e.g., the length of each interval of the y-axis of depth chart 402) of the selected sample.

Figure 6A:
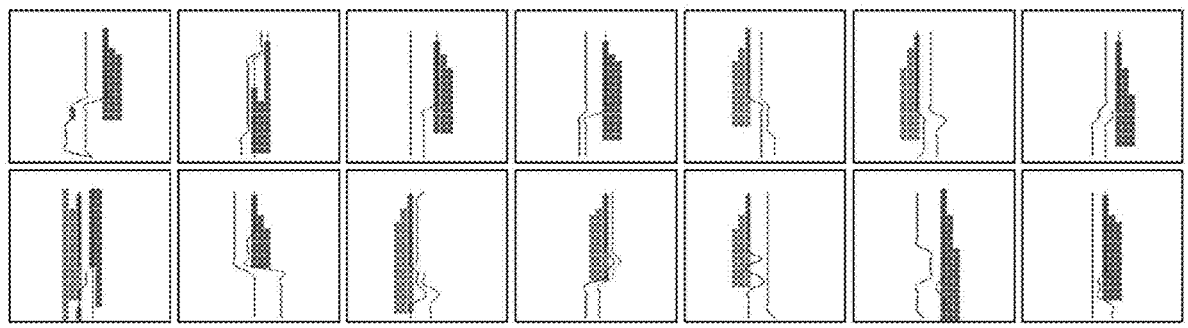
FIGS. 6A and 6B illustrate training data for the system in FIG. 3.
Figure 6B:
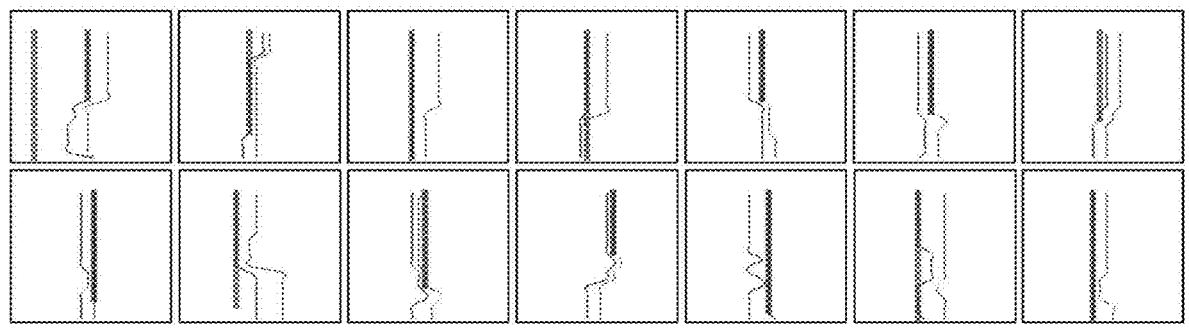

A model may be trained based on the classification of positive (FIG. 6A) and negative (FIG. 6B) examples. Positive examples labeled with binary classifier "1" may display a pattern indicating a target behavior, and negative examples labeled with binary classifier "0" may display patterns not indicating the behavior. In FIGS. 6A and 6B, the boxes indicate interest, with the dark boxes being asks and the light boxes being bids. The two curves in each thumbnail image are PBBO curves.

Machine-learning component 304 may also include a convolutional neural network (CNN) built, for example, in Keras running on Tensorflow. The CNN may be a multilayer CNN layer model applied to the generated samples, e.g., examples in FIGS. 6A and 6B, and may be trained to identify images displaying data indicating the behavior. In some embodiments, machine-learning component 304 implements feature learning using a CNN to learn characteristics of patterns or behaviors in a series of data. Machine-learning component 304 may use a deep-learning neural network to classify time-series data based on the patterns.

The trained models may be stored in database 110 or used by monitoring component 306. Monitoring component 306 may receive market data from market interface 104 or receive depth data from depth-charting component 302 and apply the models, such as machine-learning component 304 generated from the received data, to identify patterns associated with target behaviors of market participants.

Using a model on market data, monitoring component 306 may determine a participant is attempting to manipulate the market and then generate an alert to behavior-monitoring system 102 or to user device 106.

Figure 7:
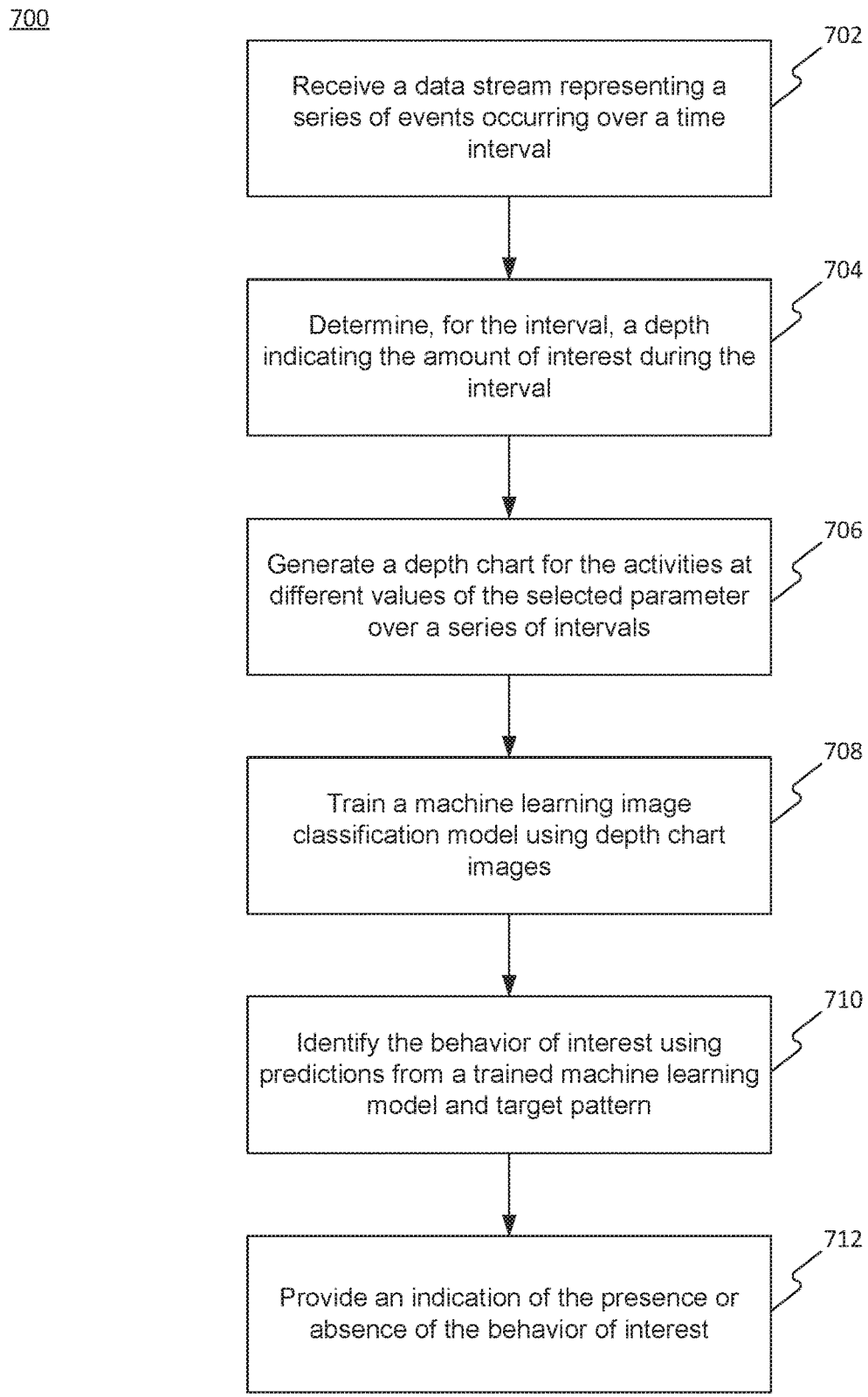
FIG. 7 is a flowchart of a method for identifying patterns consistent with the invention.

FIG. 7 is a flow chart of a method 700 consistent with invention for identifying a pattern in data to detect a behavior of interest. System 100 can implement method 700. In this example, the target behavior is market manipulation and system 100 receives the selection via a GUI on a user device.

At step 702, system 100, and particularly behavior-monitoring system 102, receives a data stream representing a series of events occurring over a time interval. In this example, behavior-monitoring system 102 receives from market interface 104 market data that may indicate market participant positions at various times and price points.

At step 704, the system determines, for an interval, a depth indicating the amount of interest during the interval. The interest represents an amount of a selected activity during the interval for a selected parameter. The selected activity may be buy- or sell-side interest. In this example, values associated with the depth include total interest as a percentage of the maximum total interest at a price point; market participant interest as a percentage of the total interest, and the market participant published interest as a percentage of market participant interest. The depth may also include additional values, like total published interest as a percentage of the total interest; market participant interest as a percentage of the total interest; and the market participant published interest as a percentage of total published interest.

At step 706, the system generates a depth chart for the activities at different values of the parameter over a series of intervals. Depth-charting component 302 may analyze the received data stream to generate a depth chart for a given market participant or period. The parameter may be price, cost, interest, quantity, etc. An interface of behavior-monitoring system 102 or user device 106 may display the generated depth chart, and database 110 may store it.

At step 708, the system (e.g., machine-learning component 304) trains a machine-learning image classification model using depth chart images. The depth charts may be classified according to whether the data indicates a pattern associated with a behavior. The model may also be trained based on the set of classified depth charts.

At step 710, the system may identify the behavior of interest using predictions from a trained machine-learning model and target pattern. Machine-learning component 304 or monitoring component 306 may apply a model to a depth chart generated from market data that market interface 104 provides. The system can use the model to identify the presence of a target pattern based on sufficient matching between the target pattern and the pattern from data of the depth chart or the PBBO curves.

Monitoring component 306 may receive real-time or near real-time depth data generated by depth-charting component 302. Component 306 may apply this data to the models from machine-learning component 304 to identify whether a market participant's behavior shows an attempt to manipulate the market.

At step 712, the system may provide an indication of the presence or absence of the behavior of interest. The system may also provide images of the depth chart sufficient to show the behavior that may correspond to any target patterns. For example, the system may provide one or more thumbnail images indicating the depth charts showing market participant behavior matching the identified pattern.

In response to detecting market manipulation, monitoring component 306 may generate alerts that may include market-participant information and depth charts associated with the participant. The alerts may appear via an interface of behavior-monitoring system 102, such as an interface for user device 106.

Those skilled in the art will understand that the disclosed systems and methods may have various modifications and variations based the specification and practice of the disclosed systems and methods. The embodiments in the specification are only exemplary, with the invention's true scope being in the following claims and their equivalents.

What is claimed is:

1. A system for identifying a target pattern in data to detect a behavior of interest associated with game theory comprising:
   an input device to provide the data;
   an output device to provide an indication of the behavior of interest;
   a memory device storing instructions to identify the target pattern; and
   a processor to execute the instructions to cause the system to
      receive, via the input device, a data stream representing a series of events occurring over a time interval;
      determine, for the time interval, a depth indicating an amount of open interest available at any instant in the time interval at all price points, wherein the interest represents an amount of a selected activity during the time interval for a selected parameter;
      generate a depth chart for the activities at different values of the selected parameter over a series of time intervals, wherein the depth chart is a graph of a price and time steps during each time interval and displays a cell indicating the interest of one or more market participants;
      train a machine-learning image-classification model using a training set of depth chart images, the training set of depth chart images including at least one positive depth chart image indicating the behavior of interest and at least one negative depth chart image not indicating the behavior of interest;
      identify the behavior of interest by applying the trained image-classification machine-learning model and the target pattern, wherein the trained image-classification machine-learning model is applied by one or more neural networks configured to receive at least one input depth chart image, determine whether the at least input one depth chart image matches the at least one positive depth chart image, and to generate a classification as output associated with a presence or absence of the behavior of interest;
      provide an indication of the presence or absence of the behavior of interest via the output device; and
      train the machine-learning image-classification model using the classification associated with the presence or absence of the behavior of interest.

2. The system of claim 1, wherein executing instructions to provide the indication comprises executing instructions to display images of portions of the depth chart.

3. The system of claim 1, wherein the parameter represents a quantity and associated price of a commodity in a market.

4. The system of claim 3, wherein the depth includes values of a total interest as a percentage of a maximum interest.

5. The system of claim 3, wherein the depth includes values of a total participant interest as a percentage of a total interest.

6. The system of claim 3, wherein the depth includes values of a total participant published interest as a percentage of a total participant interest.

7. The system of claim 3, wherein the depth includes values of a bid or an ask associated with a participant.

8. The system of claim 2, wherein executing instructions to display images of portions of the depth chart comprises displaying participant data associated with each depth via a graphical user interface.

9. The system of claim 1, wherein the depth chart images comprise a protected best bid and offer curve.

10. The system of claim 1, wherein executing instructions to identify the behavior of interest includes executing instructions to compare patterns corresponding to the depth chart and to a protected best bid and offer curve.

11. The system of claim 1, wherein the behavior of interest relates to market manipulation.

12. A method for identifying a target pattern in data to detect a behavior of interest associated with game theory, the method comprising the steps of:
receiving, from an input device, a data stream representing a series of events occurring over a time interval;
determining, for the time interval, a depth indicating an amount of open interest available at any instant in the time interval at all price points, wherein the interest represents an amount of a selected activity during the time interval for a selected parameter;
generating a depth chart for the activities at different values of the selected parameter over a series of time intervals, wherein the depth chart is a graph of a price and time steps during each time interval and displays a cell indicating the interest of one or more market participants;
training a machine-learning image-classification model a training set of using depth chart images, the training set of depth chart images including at least one positive depth chart image indicating the behavior of interest and at least one negative depth chart image not indicating the behavior of interest;
identifying the behavior of interest by applying the trained image-classification machine-learning model and the target pattern, wherein the trained image-classification machine-learning model is applied by one or more neural networks configured to receive at least one input depth chart image, determine whether the at least input one depth chart image matches the at least one positive depth chart image, and to generate a classification as output associated with a presence or absence of the behavior of interest;
providing an indication of the presence or absence of the behavior of interest to an output device; and
training the machine-learning image-classification model using the classification associated with the presence or absence of the behavior of interest.

13. The method of claim 12, wherein the step of providing the indication comprises displaying images of portions of the depth chart.

14. The method of claim 12, wherein the parameter represents a quantity and associated price of a commodity in a market.

15. The method of claim 14, wherein the depth includes values of a total interest as a percentage of a maximum interest.

16. The method of claim 14, wherein the depth includes values of a total participant interest as a percentage of a total interest.

17. The method of claim 14, wherein the depth includes values of a total participant published interest as a percentage of a total participant interest.

18. The method of claim 14, wherein the depth includes values of a bid or ask associated with a participant.

19. The method of claim 13, wherein the step of displaying images of portions of the depth chart comprises displaying participant data associated with each depth via a graphical user interface.

20. The method of claim 12, wherein the step of identifying the behavior of interest comprises comparing patterns corresponding to the depth chart and to a protected best bid and offer curve.

21. The method of claim 12, wherein the behavior of interest relates to market manipulation.

22. A non-transitory computer-readable medium comprising instructions configured to cause a processor to perform a method comprising the steps of:
receiving from an input device a data stream representing a series of events occurring over a time interval;
determining, for the time interval, a depth indicating an amount of open interest available at any instant in the time interval at all price points, wherein the interest represents an amount of a selected activity during the time interval for a selected parameter;
generating a depth chart for the activities at different values of the selected parameter over a series of time intervals, wherein the depth chart is a graph of a price and time steps during each time interval and displays a cell indicating the interest of one or more market participants;
training a machine-learning image-classification model using a training set of depth chart images, the training set of depth chart images including at least one positive depth chart image indicating the behavior of interest and at least one negative depth chart image not indicating the behavior of interest;
identifying a behavior of interest associated with game theory by applying the trained machine-learning image-classification model and a target pattern, wherein the trained image-classification machine-learning model is applied by one or more neural networks configured to receive at least one input depth chart image, determine whether the at least input one depth chart image matches the at least one positive depth chart image, and to generate a classification as output associated with a presence or absence of the behavior of interest;
providing an indication of the presence or absence of the behavior of interest to an output device; and
training the machine-learning image-classification model using the classification associated with the presence or absence of the behavior of interest.

* * * * *